Figure 1:
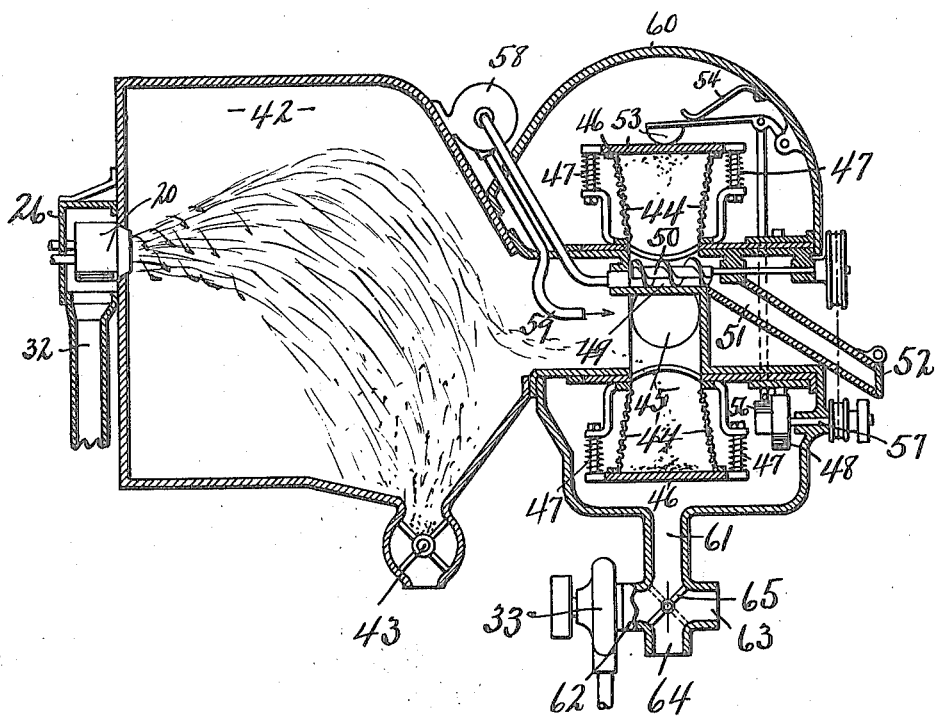

I. S. & O. E. MERRELL.
PROCESS FOR OBTAINING THE SOLIDS FROM LIQUIDS.
APPLICATION FILED JAN. 18, 1916.

1,193,173.

Patented Aug. 1, 1916.
3 SHEETS—SHEET 1.

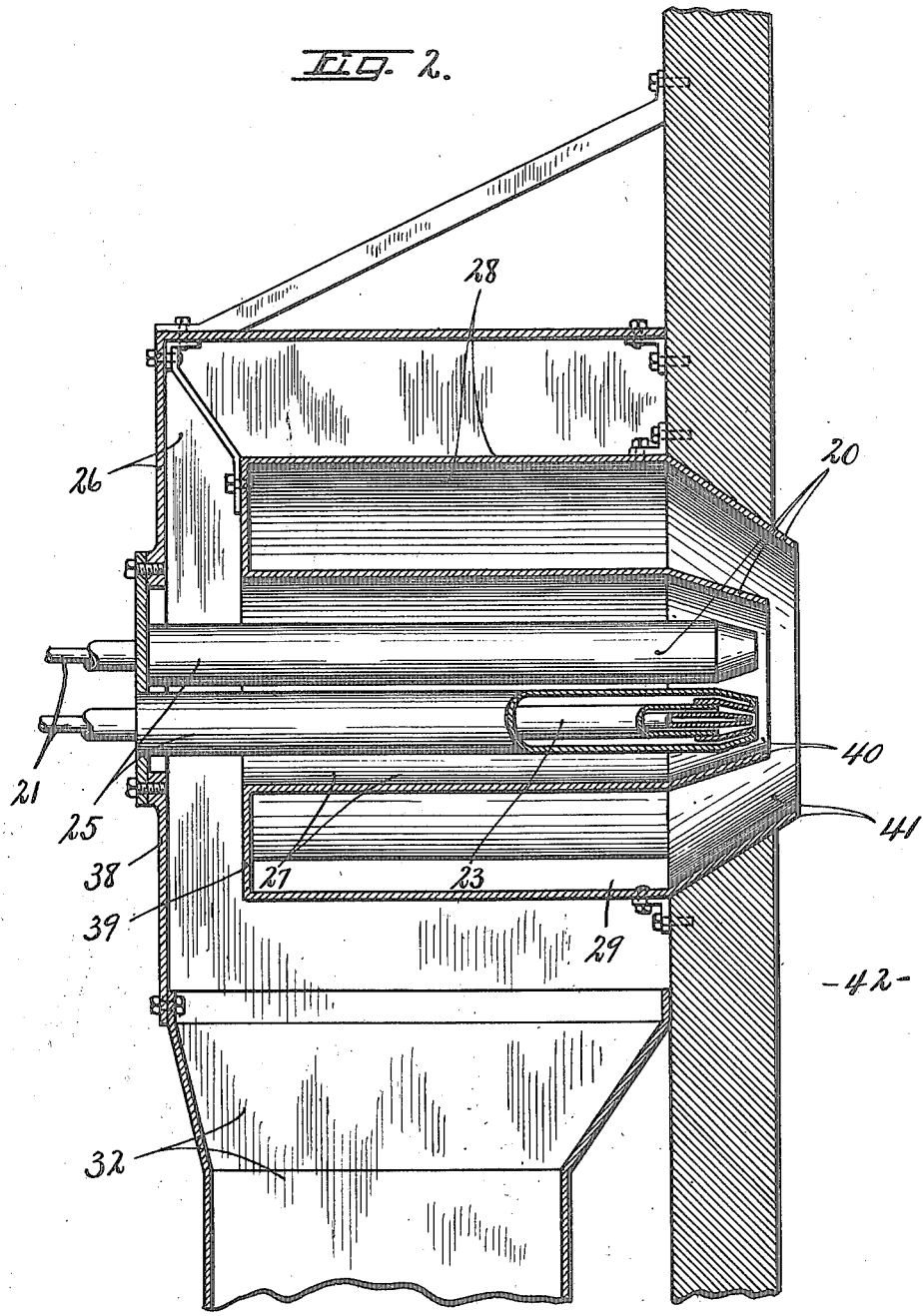

I. S. & O. E. MERRELL.
PROCESS FOR OBTAINING THE SOLIDS FROM LIQUIDS.
APPLICATION FILED JAN. 18, 1916.
1,193,173.
Patented Aug. 1, 1916.
3 SHEETS—SHEET 3.
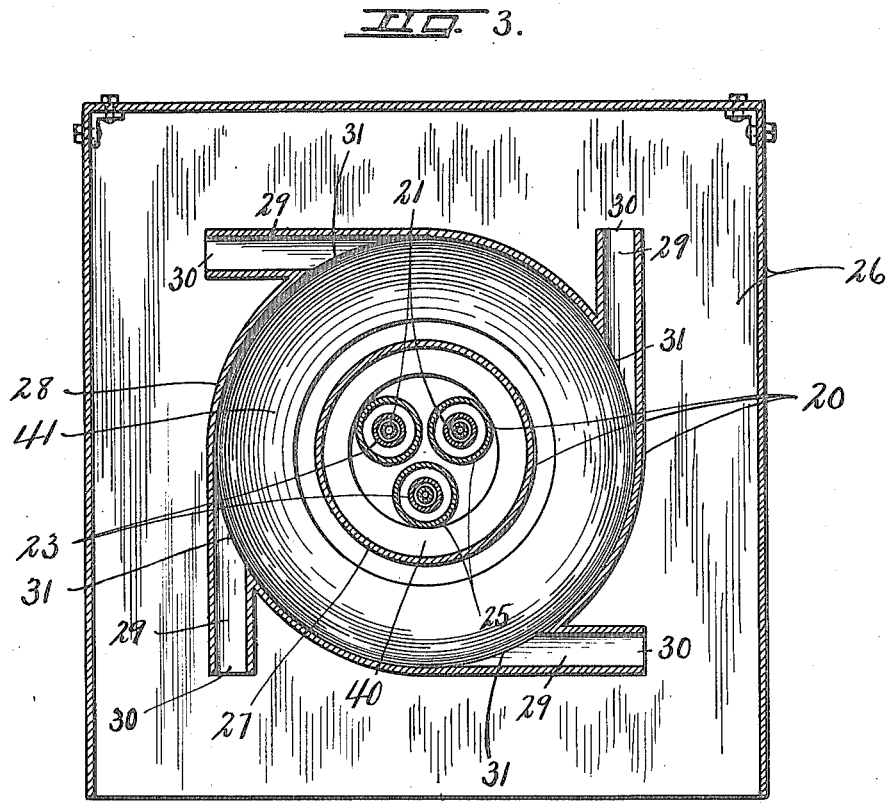
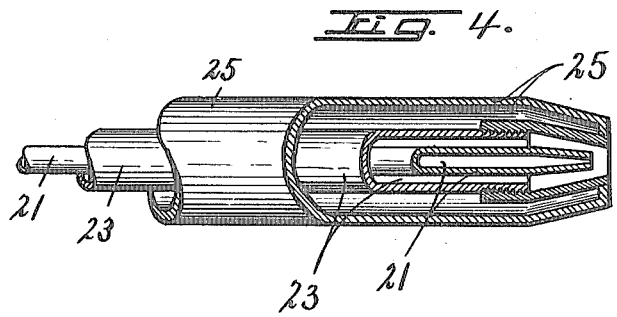

UNITED STATES PATENT OFFICE.

IRVING S. MERRELL AND OLIVER E. MERRELL, OF SYRACUSE, NEW YORK, ASSIGNORS TO MERRELL-SOULE COMPANY, OF SYRACUSE, NEW YORK, A CORPORATION OF NEW YORK.

PROCESS FOR OBTAINING THE SOLIDS FROM LIQUIDS.

1,193,173.  Specification of Letters Patent.  Patented Aug. 1, 1916.

Original application filed April 4, 1910, Serial No. 553,444. Divided and this application filed January 18, 1916. Serial No. 72,694.

*To all whom it may concern:*

Be it known that we, IRVING S. MERRELL and OLIVER E. MERRELL, citizens of the United States, and residents of Syracuse, in the county of Onondaga, in the State of New York, have invented new and useful Improvements in Processes for Obtaining the Solids from Liquids, of which the following, taken in connection with the accompanying drawings, is a full, clear, and exact description.

This invention relates to a process for obtaining the solids from organic liquids in the form of a substantially dry powder which may be returned again to its original liquid form by the addition of a suitable amount of water without any substantial impairment of the distinguishing characteristics of the original liquid, and is a specific portion of our application Serial No. 553,444 filed April 4, 1910, of which said application this application is a division.

The invention is especially applicable to and intended for the drying of organic liquids having a high moisture content, such as milk and eggs. If milk is treated, it may be in its original condition, or the cream may be first removed; and, in either case, the milk (whole or skimmed) may be condensed or concentrated before subjecting it to the desiccating operation. Cream may also be dried to a powder by the new process.

The present process is an improvement upon the invention set forth in United States Letters Patent of Robert Stauf, No. 666,711, January 29, 1901. The successful and commercial drying to a powder of such organic substances as milk and eggs having a high moisture content by the spraying process requires that there should be employed a large volume of air in proper moisture absorbing condition and that the drying should be wholly accomplished before the powder is separated from the air and collects upon the receiving or collecting surfaces. It is also desirable that the temperature of the current of drying air should be as low as consistent with proficiency to avoid any substantial alteration in the characteristics of the desiccated product. Also, it is important for commercial practice that the desiccating chamber should be small and that the rapidity of the operation should be great in order that a large amount of the organic liquid should be dried within a given length of time and a reasonable amount of space.

The present invention consists in a desiccating process carried out in an economical and efficient manner for the production of a dried powder, particularly from organic substances such as milk and eggs, in which it is essential that the normal characteristics be substantially preserved, and involves the utilization of the entire amount of heated air introduced into the desiccating chamber in disintegrating and breaking up the liquid, as well as carrying forward and desiccating the same, and, as in the apparatus disclosed, contemplates the introduction of the entire body of air through the spraying or atomizing device, with the result that the heated air is thoroughly commingled with the atomized milk and the evaporation of the liquid constituents is completed before the atomized particles contact with the walls of the chamber, and the essential separation of the dry powder from the air before condensation of the vapor carried by the same occurs. The latter feature is essential to the success of any desiccating process.

Further, the process specifically contemplates the passage of the entire body of the heated air through the atomizing device and its projection into the desiccating chamber through an orifice concentric with and surrounding the pipe or primary nozzle through which the milk is forced. The entire body of air in excess of the amount required for spraying the liquid is utilized in atomizing and minutely disintegrating the liquid while the same is projected and carried forward into the desiccating chamber, where the actual desiccation takes place.

Suitable apparatus for carrying out the new process is illustrated in the accompanying drawings, the condensing apparatus, dust collector and connections being the same as those shown in Patent No. 860,929, issued to L. C. Merrell, I. S. Merrell and W. B. Gere, the specific construction of which forms no portion of the invention claimed herein, as various well-known forms of condensing apparatus and various well-known forms of powder collecting means may be utilized.

Figure 1 is in elevation, partly in section of an apparatus for carrying out the process described and claimed herein. Fig. 2 is a longitudinal sectional view of the atomizing portion of the apparatus. Fig. 3 is a lateral sectional view of the atomizing portion of the apparatus. Fig. 4 is a detail section of a liquid spray nozzle through which the milk may primarily be forced.

In the specific disclosure of this application, the liquid is forced into the desiccating chamber through an atomizer —20— comprising, in this specific illustration, milk pipes —21—, and each pipe, if more than one be used, being surrounded by a concentric air pipe —23—, each of said air pipes in communication with any suitable source of compressed air, such as a blower or pump for the passage of air under pressure, such pipes —23— terminating in advance of the milk pipes —21—, all of the air pipes —23—, if more than one be used, surrounded and supported by inclosing tubes —25— carried by the casing —26— secured to one wall of the desiccating chamber for other purposes hereinafter described.

The milk is forced into the pipes —21—, and the air introduced through the air pipes —23— picks up the milk and tends to spray the same.

The inclosing tube or tubes —25— are surrounded by a cylindrical drum —27—, open at its rear end and in communication with the interior of the casing —26—, and arranged within and concentric with a second cylindrical drum —28—, the space between said drums forming an air whirling chamber. The air whirling chamber is circular in cross section and is in communication with the interior of casing —26— through a plurality of tangential inlet channels —29—. These channels are shown as four in number, equally spaced around the air whirling chamber and of substantially equal capacity. Each channel extends the length of the cylindrical part of the air whirling chamber and has a mouth —30— communicating with the interior of the casing —26— and a discharge port —31— communicating with the interior of the whirling chamber. The casing —26— is adapted to receive heated air under pressure through a wind trunk —32—.

The rear wall —38— of the casing —26— is spaced some distance from the rear wall —39— of the air whirling chamber between the drums —27— and —28— to allow free passage of the air through the casing to the drum —27—. At its forward end the drum —27— is provided with a discharge cone —40— terminating a short distance in front of the tubes —25— which tubes are centrally located within the drum —27—. The drum —28— is likewise provided at its forward end with a discharge cone —41— preferably terminating a short distance in front of the cone —40—, and the angle of the cone —41— is more acute than that of the cone —40—, thus contracting the outlet from the air whirling chamber between the two drums.

At the introduction of the liquid into the desiccating chamber —42—, it is subdivided into minute particles and atomized by the air forced through the air pipes —23—, the drum —27— and the air whirling chamber between the drums —27— and —28—, and is carried, generally, forward with a cotemporary spiral movement and desiccated by the air introduced through the spraying device —20— and primarily utilized in the atomizing of the liquid.

Part of the dry powder resulting from desiccation gravitates to the floor of the drying chamber, which may be provided with an outlet of any suitable construction, as a rotary gate —43—, which may be operated manually or otherwise to automatically discharge the dry powder, while the moisture-laden air is passed through an air pervious screen, as bolting cloth, which practically confines within certain limits the balance of the dry solids so that they may be collected and removed automatically or at the will of the attendant. These solids may be separated from the moisture-laden air in a rotary dust collector of the construction shown in said Patent No. 860,929 heretofore referred to and consisting of four tubular screen-partitions —44—, communicating through openings —45—, with the interior of the desiccating chamber, each tubular screen having its outer end closed by a head —46— which is movable radially against the action of springs —47—. This dust-collector is rotated intermittingly, one-quarter turn at a time, by suitable gears —48—, one of which, as the driving gear, is mutilated in such manner as, when rotated continuously, to cause the openings —45— of the screen-partitions to be successively brought into registration with the open side of a receptacle —49— in which is movable a screw cosveyer —50— for the purpose of removing the powder into a chute —51—, whence it may discharge through a self-closing valve —52— into a receptacle (not shown).

The mutilated driving gear —48— permits the screen-partitions to remain at rest while one of them, cut off from the desiccating chamber, is discharging into the receptacle —49—, and the others, in communication with the desiccating chamber, are permitting the escape of the moisture-laden air, and collecting and retaining the desiccated product.

The powder which may adhere to the sides of the discharging screen-partition is removed, partly by agitation, and partly by suction, the agitating means consisting of a beater —53— acting upon the head —46— through the medium of a spring —54— and an operating rod —55— which is actuated by a revolving toothed rack —56— on the main driving shaft, as 57. This toothed rack is mutilated in such manner as to actuate the beater, while the screen-partitions are at rest, and to cease such action immediately before the next quarter-rotation of the dust-collector.

The removal of the powder from the discharging screen-partition is facilitated by a suction-pump —58— having its inlet communicating with the interior of the receptacle —49—.

In order that the process and apparatus may be fully understood, the details of one practical installation will be given. A volumetric air blower, as blower —33—, capable of driving a large volume of air is employed, having a blower discharge of one hundred and thirty three (133) square inches; and the blower speed is fourteen hundred (1400) revolutions a minute. This requires about four (4) horse power. The air pressure within the trunk —32— is three quarters (.75) ounce per square inch. Such a blower will deliver about twenty-five hundred (2500) cubic feet of air per minute to the desiccating chamber. The internal length from front to rear of the trunk —32— is twenty-four (24) inches and its width is thirty-two (32) inches. The internal diameter of the whirling chamber is twenty (20) inches, and the length of the cylindrical part of said chamber is nineteen and one-half (19½) inches. The height of cone —41— is five and three-fourths (5.75) inches; and the internal diameter of the discharge opening from cone —41— is twelve and one-half (12½) inches. The internal diameter of the drum —27— is ten (10) inches; the length of the inclined wall of cone —40— is five and one-fourth (5.25) inches; and the internal diameter of the discharge opening of the drum is seven (7) inches. The width of each channel —29— is two (2) inches. The desiccating chamber —42— is eight and one-half (8½) feet high, eleven (11) feet long from the air-inlet from cone —41— to the opposite wall, and is eight (8) feet wide. The moisture laden air passes out through any suitable screened opening or foraminous dust collector, such as that described. The air is introduced within the trunk —32— after being heated by passage over steam coils, the heating being such that the average temperature within the chamber —42— is one hundred and sixty-four (164) degrees Fahrenheit. The external diameter of each tube —25— is two and five-eighths (2.625) inches.

The internal diameter of the liquid outlet from the pipe —21— is one-sixteenth (.0625) of an inch, and the internal diameter of the outlet from the air pipe —23— is one-eighth (.125) of an inch. The pressure of the air supplied to each pipe —23— is thirty (30) pounds per square inch. The relative location of the outlets from the drum and air whirling chamber with respect to the spray nozzle is properly shown in the drawings; the nozzles being within the drum outlet; and the drum outlet within the air whirling chamber outlet. These details are subject to variation depending upon practical conditions, such as the initial dryness of the air, the amount of moisture in the milk or other organic liquid, the quantity to be treated, and the pressure in the steam coils. The amount of air supplied must be regulated to correspond with its initial condition, the heating effect of the steam coils and the character and quantity of the liquid to be treated; expertness in which can be secured only through practical experience.

The process herein preferably involves the concentration of the milk in a suitable apparatus, as the commercial vacuum pan, and consists in forcing the concentrated milk through a milk discharge pipe or primary nozzle into a moving body of heated air introduced through a chamber or chambers, preferably concentric with said primary nozzle or nozzles so that the liquid is enveloped and picked up by said heated air, atomized, scattered, and carried forward into the desiccating chamber, where it is desiccated by the body of heated air in excess of the amount required for atomization alone, and is separated from the air and vapor, either by gravity or suitable dust collecting means, or both, before condensation of the vapor occurs, so that the resultant powder contains no amount of moisture sufficient to cause deterioration in the quality of the powder when kept for prolonged periods of time.

It should be understood that the number of primary spray nozzles used is entirely optional, and the apparatus may embody one or more, as desired, in accordance with the amount and temperature of the air introduced through the atomizing means, and that such spray nozzles may be of any known construction, operated by either air or liquid pressure, to initially introduce the liquid into the atomizing and desiccating air, and that many and various changes may be made in the specific construction of apparatus and specific application of process, and in the details of both apparatus and process without departing from the spirit of this invention as set forth in the appended claims.

What we claim is:

1. The process of producing desiccated milk powder which comprises removing a portion of the water contents of the milk by evaporation, atomizing the condensed milk in a chamber, and surrounding the atomized condensed milk with an envelop of forcibly projected air.

2. The process of producing desiccated milk powder which comprises removing a portion of the water contents of the milk by evaporation, atomizing the condensed milk in a chamber, subjecting the atomized condensed milk to the action of moisture absorbing air, and holding the atomized condensed milk in suspension in said air a sufficient period to practically completely vaporize the remaining liquid constituents thereof.

3. The process of producing desiccated milk powder which comprises removing a portion of the water contents of the milk by evaporation, atomizing the condensed milk in a chamber, and surrounding the atomized milk with a drying agent moving in substantially the same general direction as the atomized liquid.

4. The process of producing desiccated milk powder which comprises removing a portion of the water contents of the milk by evaporation, atomizing the condensed milk in a chamber, and surrounding the atomized liquid with an envelop of forcibly projected air introduced under pressure and moving in the same general direction as the finely divided liquid.

5. The process of producing desiccated milk powder which comprises removing a portion of the water contents of the milk by evaporation, atomizing the condensed milk in a chamber, subjecting the atomized condensed milk to the action of moisture absorbing air, holding the atomized condensed milk in suspension in said air a sufficient period to practically completely vaporize the remaining liquid constituents thereof, and separating the dry powder from the air by discharging the air separately from the powder.

6. The process of producing desiccated milk powder which comprises removing a portion of the water contents of the milk by evaporation, atomizing the condensed milk in a chamber, and surrounding the atomized condensed milk with an envelop of forcibly projected whirling air.

7. The process of producing desiccated milk powder which comprises removing a portion of the water contents of the milk by evaporation, atomizing the condensed milk in a chamber, and surrounding the atomized liquid with an envelop of forcibly projected whirling air introduced under pressure and moving in the same general direction as the finely divided liquid.

In witness whereof we have hereunto set our hands this 15th day of January, 1916.

IRVING S. MERRELL.
OLIVER E. MERRELL.

Witnesses:
E. A. Thompson,
M. Viola Howland.